(12) United States Patent
Fu

(10) Patent No.: US 11,281,781 B2
(45) Date of Patent: Mar. 22, 2022

(54) KEY PROCESSING METHODS AND APPARATUSES, STORAGE MEDIA, AND PROCESSORS

(71) Applicant: Alibaba Group Holding Limited, Grand Cayman (KY)

(72) Inventor: Yingfang Fu, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 114 days.

(21) Appl. No.: 16/538,008

(22) Filed: Aug. 12, 2019

(65) Prior Publication Data
US 2020/0074088 A1 Mar. 5, 2020

(30) Foreign Application Priority Data
Aug. 29, 2018 (CN) .......................... 201810997242.0

(51) Int. Cl.
*G06F 21/60* (2013.01)
*G06F 21/33* (2013.01)
*H04L 9/08* (2006.01)

(52) U.S. Cl.
CPC ............ *G06F 21/602* (2013.01); *G06F 21/33* (2013.01); *H04L 9/0825* (2013.01); *H04L 9/0869* (2013.01)

(58) Field of Classification Search
None
See application file for complete search history.

(56) References Cited

U.S. PATENT DOCUMENTS 7,967,193 B1 6/2011 McGinley et al.
8,442,960 B1 5/2013 Meyer et al.
(Continued)

FOREIGN PATENT DOCUMENTS

CN 1553349 12/2004
CN 201051744 Y 4/2008
(Continued)

OTHER PUBLICATIONS

GB, "Information security technology—Trusted computing specification—Motherboard Funcation adn interfae of trusted Platform", Nov. 12, 2013, 414 pages.
(Continued)

*Primary Examiner* — Benjamin E Lanier
(74) *Attorney, Agent, or Firm* — Lee & Hayes, P.C.

(57) ABSTRACT

Key processing methods and apparatuses, storage media, and processors are disclosed. A method includes: a security chip receiving a dynamic measurement request for a cryptographic operation; and the security chip generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations. The present disclosures solves the technical problems that existing key processing methods cannot guarantee the integrity of cryptographic operation algorithm firmware and the credibility of cryptographic operation execution environments during a cryptographic operation process.

14 Claims, 9 Drawing Sheets

(56) References Cited

U.S. PATENT DOCUMENTS

| | | |
|---|---|---|
| 8,645,711 B2 | 2/2014 | Ohhashi |
| 8,767,957 B1 | 7/2014 | Bagchi et al. |
| 8,931,082 B2 | 1/2015 | Rodgers et al. |
| 9,081,954 B2 | 7/2015 | Forristal |
| 9,246,690 B1 | 1/2016 | Roth et al. |
| 9,294,282 B1 | 3/2016 | Potlapally et al. |
| 9,530,002 B1 | 12/2016 | Hamlin |
| 9,893,882 B1 | 2/2018 | Thadishetty |
| 10,211,977 B1 | 2/2019 | Roth et al. |
| 10,891,366 B1* | 1/2021 | Wu ................. H04L 9/0894 |
| 11,026,628 B1 | 6/2021 | Bruinsma et al. |
| 2003/0097581 A1 | 5/2003 | Zimmer |
| 2003/0188146 A1 | 10/2003 | Hale et al. |
| 2004/0158828 A1 | 8/2004 | Zimmer et al. |
| 2004/0190721 A1 | 9/2004 | Barrett et al. |
| 2005/0108564 A1 | 5/2005 | Freeman et al. |
| 2005/0166024 A1 | 7/2005 | Angelo et al. |
| 2005/0251857 A1 | 11/2005 | Schunter et al. |
| 2005/0262571 A1 | 11/2005 | Zimmer et al. |
| 2005/0289646 A1 | 12/2005 | Zimmer et al. |
| 2006/0010326 A1 | 1/2006 | Bade et al. |
| 2006/0059369 A1 | 3/2006 | Fayad et al. |
| 2006/0075223 A1 | 4/2006 | Bade et al. |
| 2006/0155988 A1 | 7/2006 | Hunter et al. |
| 2006/0289659 A1 | 12/2006 | Mizushima |
| 2007/0094711 A1 | 4/2007 | Corley et al. |
| 2007/0143543 A1 | 6/2007 | Lin et al. |
| 2007/0154018 A1 | 7/2007 | Watanabe |
| 2008/0005586 A1 | 1/2008 | Munguia |
| 2008/0046581 A1 | 2/2008 | Molina et al. |
| 2008/0072071 A1* | 3/2008 | Forehand ............ G06F 21/602 713/193 |
| 2008/0077993 A1 | 3/2008 | Zimmer et al. |
| 2008/0126779 A1 | 5/2008 | Smith |
| 2008/0192937 A1 | 8/2008 | Challener |
| 2008/0223925 A1 | 9/2008 | Saito et al. |
| 2008/0244746 A1 | 10/2008 | Rozas et al. |
| 2008/0270781 A1 | 10/2008 | Ibrahim et al. |
| 2009/0043708 A9 | 2/2009 | Silverbook et al. |
| 2009/0067689 A1 | 3/2009 | Porter et al. |
| 2009/0070593 A1 | 3/2009 | Boshra et al. |
| 2009/0144046 A1 | 6/2009 | Rothman et al. |
| 2009/0172378 A1 | 7/2009 | Kazmierczak et al. |
| 2010/0011219 A1 | 1/2010 | Burton et al. |
| 2010/0023747 A1 | 1/2010 | Asnaashari et al. |
| 2010/0082960 A1 | 4/2010 | Grobman et al. |
| 2010/0088499 A1 | 4/2010 | Zimmer et al. |
| 2010/0174652 A1 | 7/2010 | Shear et al. |
| 2010/0281273 A1 | 11/2010 | Lee et al. |
| 2011/0013773 A1 | 1/2011 | Pinder |
| 2011/0211690 A1 | 9/2011 | Tu et al. |
| 2011/0302638 A1* | 12/2011 | Cha ................. H04L 63/08 726/6 |
| 2012/0151223 A1 | 6/2012 | Conde Marques et al. |
| 2012/0185683 A1 | 7/2012 | Krstic et al. |
| 2012/0201379 A1 | 8/2012 | Fuchs et al. |
| 2012/0266252 A1 | 10/2012 | Spiers et al. |
| 2012/0331285 A1 | 12/2012 | Bangerter et al. |
| 2013/0016832 A1 | 1/2013 | Yamashita |
| 2013/0104188 A1 | 4/2013 | Western et al. |
| 2013/0125204 A1 | 5/2013 | La Fever et al. |
| 2013/0318343 A1 | 11/2013 | Bjarnason et al. |
| 2014/0068766 A1 | 3/2014 | Kiustaitis et al. |
| 2014/0122897 A1 | 5/2014 | Dodeja et al. |
| 2014/0140512 A1 | 5/2014 | Hadley |
| 2014/0250291 A1 | 9/2014 | Adams et al. |
| 2014/0256419 A1 | 9/2014 | Laputz et al. |
| 2014/0258733 A1 | 9/2014 | Scott-Nash |
| 2014/0298040 A1 | 10/2014 | Ignatchenko et al. |
| 2014/0359268 A1 | 12/2014 | Jauhiainen et al. |
| 2015/0012737 A1 | 1/2015 | Newell |
| 2015/0074387 A1 | 3/2015 | Lewis |
| 2015/0074392 A1 | 3/2015 | Boivie et al. |
| 2015/0100299 A1 | 4/2015 | Abraham et al. |
| 2015/0200934 A1 | 7/2015 | Naguib |
| 2016/0026810 A1 | 1/2016 | Hagiwara et al. |
| 2016/0065375 A1 | 3/2016 | Kahana et al. |
| 2016/0070932 A1 | 3/2016 | Zimmer et al. |
| 2016/0098283 A1 | 4/2016 | Martinez et al. |
| 2016/0119141 A1 | 4/2016 | Jing et al. |
| 2016/0142772 A1 | 5/2016 | Pinder et al. |
| 2016/0306977 A1 | 10/2016 | Zarakas et al. |
| 2017/0118018 A1 | 4/2017 | Dekker et al. |
| 2017/0132159 A1 | 5/2017 | Joshi et al. |
| 2017/0257365 A1 | 9/2017 | Gonzalez et al. |
| 2017/0329685 A1 | 11/2017 | Jenkins et al. |
| 2017/0364685 A1 | 12/2017 | Shah et al. |
| 2018/0004980 A1 | 1/2018 | Kuczynski et al. |
| 2018/0026969 A1* | 1/2018 | Newton ................. G06F 21/31 713/176 |
| 2018/0069693 A1 | 3/2018 | Boivie et al. |
| 2018/0091311 A1 | 3/2018 | Kisley et al. |
| 2018/0091314 A1 | 3/2018 | Li et al. |
| 2018/0101689 A1 | 4/2018 | Arnold et al. |
| 2018/0109377 A1 | 4/2018 | Fu |
| 2018/0157839 A1 | 6/2018 | Pearson |
| 2018/0167268 A1 | 6/2018 | Liguori et al. |
| 2018/0174013 A1 | 6/2018 | Lee |
| 2018/0288011 A1 | 10/2018 | Marquardt et al. |
| 2018/0343110 A1 | 11/2018 | Funk |
| 2018/0367317 A1 | 12/2018 | Forler et al. |
| 2019/0036893 A1 | 1/2019 | Jiang |
| 2019/0080099 A1 | 3/2019 | Roth et al. |
| 2019/0095192 A1 | 3/2019 | Akita et al. |
| 2019/0103961 A1 | 4/2019 | Chhabra et al. |
| 2019/0108332 A1 | 4/2019 | Glew et al. |
| 2019/0124054 A1 | 4/2019 | Zhang et al. |
| 2019/0163910 A1* | 5/2019 | Moon ................. G06F 12/1441 |
| 2019/0213359 A1* | 7/2019 | Kepa .................. H04L 9/0866 |
| 2019/0259029 A1 | 8/2019 | Chilton et al. |
| 2019/0268155 A1 | 8/2019 | Guo |
| 2019/0311126 A1 | 10/2019 | Areno et al. |
| 2019/0334713 A1 | 10/2019 | Fu et al. |
| 2019/0392151 A1 | 12/2019 | Lee et al. |
| 2020/0004967 A1 | 1/2020 | Fu et al. |
| 2020/0026882 A1 | 1/2020 | Fu et al. |
| 2020/0042709 A1 | 2/2020 | Fu et al. |
| 2020/0044841 A1 | 2/2020 | Fu et al. |
| 2020/0074121 A1 | 3/2020 | Fu |
| 2020/0074122 A1 | 3/2020 | Fu et al. |
| 2020/0104528 A1 | 4/2020 | Fu |
| 2020/0117805 A1* | 4/2020 | Li .................. H04L 9/3247 |
| 2020/0226586 A1 | 7/2020 | Lu et al. |
| 2020/0410097 A1 | 12/2020 | Miller |
| 2021/0056066 A1 | 2/2021 | Vijayrao |

FOREIGN PATENT DOCUMENTS

| | | |
|---|---|---|
| CN | 101344904 | 9/2010 |
| CN | 101997834 B | 3/2011 |
| CN | 102438013 | 5/2012 |
| CN | 104778141 A | 7/2015 |
| CN | 106230584 A | 12/2016 |
| CN | 106372487 | 2/2017 |
| CN | 103856478 | 11/2017 |
| CN | 108243009 A | 7/2018 |
| CN | 110795774 | 8/2018 |
| CN | 201810871817.4 A | 8/2018 |
| CN | 109614799 A | 4/2019 |
| CN | 109784070 A | 5/2019 |
| CN | 108234115 | 3/2021 |
| CN | 108011716 | 4/2021 |
| JP | 2005275467 A | 10/2005 |
| WO | WO2016160597 | 10/2016 |
| WO | WO2019098573 A1 | 5/2019 |

OTHER PUBLICATIONS

Haung et al., "The TPCM 3P3C Defense Architecture of Safety and Trusted Platform," retrieved on Jun. 28, 2019 at http://www.wuj.whu.edu.cn/d/file/allhtml/lx/lx1802/337159b2-52a0-4cb0-a373-26f5bebd3834.htm, vol. 64 No. 2, Apr. 2019 (6 pages).

(56) References Cited

OTHER PUBLICATIONS

Intel QAT powers Nginx compression processing—Linux high, retrieved on Jul. 3, 2019 at https://syswift.com/407.html, 21 pages.

PCT Search Report and Written Opinion dated Jul. 30, 2019 for PCT Application No. PCT/US19/28989, 7 pages.

mamicode.com, "Trusted Execution Technology—Basic Principles," retrieved on Jun. 28, 2019 from http://www.mamicode.com/info-detail-2182008.html, time stamped Feb. 4, 2018 (8 pages).

Office Action for U.S. Appl. No. 16/529,524, dated Apr. 2, 2021, Fu, "Measurement Processing of High-Speed Cryptographic Operation ", 30 Pages.

Office Action for U.S. Appl. No. 16/393,870, dated Apr. 5, 2021, Fu, "Encryption Card, Electronic Device, and Encryption Service Method", 10 Pages.

Office Action for U.S. Appl. No. 16/460,907, dated May 11, 2021, Fu, "Methods and Systems for Activating Measurement Based on a Trusted Card", 22 Pages.

Office Action for U.S. Appl. No. 16/529,582, dated May 26, 2021, "Measurement Methods, Devices and Systems Based on Trusted High-Speed Encryption Card", 9 Pages.

Olzak, "Chapter 8—UEFI and the TPM: Building a foundation for the platform trust", retrieved at <<https://resources.infosecinstitute.com/topic/uefl-andtpm-2>>, Jun. 2012, 18 pgs.

Office Action for U.S. Appl. No. 16/554,383, dated Jun. 24, 2021, "Cryptographic Operation Processing Method, Apparatus, and System, and Method for Building Measurement for Trust Chain", 78 Pages.

Office Action for U.S. Appl. No. 16/554,241, dated Jul. 14, 2021, Fu, "Cryptographic Operation Processing Methods, Apparatuses, and Systems", 23 Pages.

Office Action for U.S. Appl. No. 16/393,870, dated Jul. 27, 2021, Fu, "Encryption Card, Electronic Device, and Encryption Service Method", 11 Pages.

Office Action for U.S. Appl. No. 16/457,650, dated Aug. 9, 2021, Fu, "Key and Certificate Distribution Method, Identity Information Processing Method, Device, and Medium", 8 Pages.

Office Action for U.S. Appl. No. 16/586,463, dated Aug. 16, 2021, Fu, "Data Processing Method, Device and System", 19 Pages.

Office Action for U.S. Appl. No. 16/460,907, dated Sep. 21, 2021, Fu, "Methods and Systems for Activating Measurement Based On a Trusted Card", 25 Pages.

Office Action for U.S. Appl. No. 16/554,383, dated Oct. 13, 2021, Fu, "Cryptographic Operation Processing Method, Apparatus, and System, and Method for Building Measurement for Trust Chain", 76 pgs.

Trusted Platform Module 2.0, Oct. 2017, Microsoft Corporation, 2017, 3 pgs.

Office Action for U.S. Appl. No. 16/554,241, dated Nov. 15, 2021, Fu, "Cryptographic Operation Processing Methods, Apparatuses, and Systems", 24 Pages.

Zhang, et al., "A New Approach of TPM Construction Based on J2810", Wuhan University Journal of Natural Sciences, vol. 12, No. 1, https://doi.org/10.1007/s11859-006-0146-6, 2007, 4 pgs.

Extended European Search Report dated Dec. 13, 2021 for European Patent Application No. 19793424.3, 8 pages.

English Translation of CN Office Action dated Jan. 6, 2022 for CN Patent Application No. 201810996079.6, 39 pages.

Office Action for U.S. Appl. No. 16/586,463, dated Feb. 4, 2022, Fu, "Data Processing Method, Device and System", 23 Pages.

\* cited by examiner

KEY PROCESSING METHODS AND APPARATUSES, STORAGE MEDIA, AND PROCESSORS

CROSS REFERENCE TO RELATED PATENT APPLICATIONS

This application claims priority to Chinese Patent Application No. 201810997242.0, filed on 29 Aug. 2018 and entitled "Key Processing Methods and Apparatuses, Storage Media, and Processors," which is hereby incorporated by reference in its entirety.

TECHNICAL FIELD

The present disclosure relates to the field of computer information security, and particularly to key processing methods and apparatuses, storage media, and processors.

BACKGROUND

With the widespread application of computer technologies, ensuring the integrity of service platforms and systems has become increasingly important. Measurements are new technical means of protecting the integrity of the service platforms and systems. At certain designated moments, a target is measured to obtain certain information of the target (for example, a hash value of a file), and values of these pieces of information are compared with standard values recorded in advance to determine whether the integrity of the target is corrupted.

A key system in a conventional trusted platform control module uses a non-cryptographic operation to dynamically measure a relevant key to ensure the integrity of a cryptographic algorithm and the credibility of an execution environment during a process of high-speed cryptographic operation of a user.

However, in a scenario of a trusted high-speed encryption card, this existing key processing method cannot guarantee the integrity of a cryptographic algorithm and the credibility of an execution environment of a cryptographic operation during a process of cryptographic operation of a user.

No effective solution has been proposed yet for the above problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer-readable instructions as permitted by the context above and throughout the present disclosure.

Embodiments of the present disclosure provides key processing methods and apparatuses, storage media, and processors, so as to at least solve the technical problems that existing key processing methods cannot guarantee the integrity of cryptographic operation algorithm firmware and the credibility of cryptographic operation execution environments during a cryptographic operation process.

In implementations, a key processing method is provided, which includes: a security chip receiving a dynamic measurement request for a cryptographic operation; and the security chip generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

In implementations, a key processing method is also provided, which includes: a cryptographic operation chip receiving a child key of a platform measurement root key transmitted by a security chip, wherein the child key of the platform measurement root key is generated by the security chip based on the platform measurement root key and a random number, the child key of the platform measurement root key is used to encrypt a loading process and an execution process measured by a dynamic measurement module, the dynamic measurement module is a module used for measuring a firmware that performs cryptographic operations; and the cryptographic operation chip storing the child key of the platform measurement root key in a local storage device.

In implementations, a key processing apparatus is also provided, which is applied to a security chip, and includes: a receiving module configured to receive a dynamic measurement request for a cryptographic operation; and a generating module configured to generate a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

In implementations, a storage medium is also provided, the storage medium including a stored program, wherein a device in which the storage medium is located is controlled to perform any one of the above-described key processing methods when the program is executed.

In implementations, a processor is further provided, the processor being configured to execute a program, wherein the program is executed to perform any of the above-described key processing methods.

Using the key processing methods provided by the embodiments of the present disclosure, a security chip receives a dynamic measurement request for a cryptographic operation. The security chip generates a child key of a platform measurement root key based on the platform measurement root key and a random number, wherein the child key of the platform measurement root key is used to encrypt a loading process and an execution process measured by a dynamic measurement module, and the dynamic measurement module is a module used for measuring a firmware that performs cryptographic operations.

It is easy to note that in a dynamic measurement process of a high-speed cryptographic operation, loading and measurement of a dynamic measurement module can be ensured to be trusted in the cryptographic operation through a participation of a child key of a platform measurement root key. Through a participation of a user's cryptographic operation measurement key, the integrity of a cryptographic algorithmic firmware and the credibility of a cryptographic operation execution environment can be guaranteed.

Therefore, the embodiments of the present disclosure achieve the purpose of ensuring the credibility of loading and measurement of a dynamic measurement module in a cryptographic operation, thereby realizing technical effects of ensuring the integrity of a cryptographic algorithm firmware and the credibility of a cryptographic operation execution environment in a process of user cryptographic operation, and further solving the technical problems that the existing key processing methods cannot guarantee the integrity of cryptographic algorithmic firmware and the credibility of cryptographic operation execution environments in a process of cryptographic operation.

BRIEF DESCRIPTION OF THE DRAWINGS

Accompanying drawings described herein are intended to provide a further understanding of the present disclosure, and are intended to be a part of the present disclosure. Exemplary embodiments of the present disclosure and a description thereof are used for explaining the present disclosure, and are not to be construed as improper limitations to the present disclosures. In the accompanying drawing.

DETAILED DESCRIPTION

Figure 1:
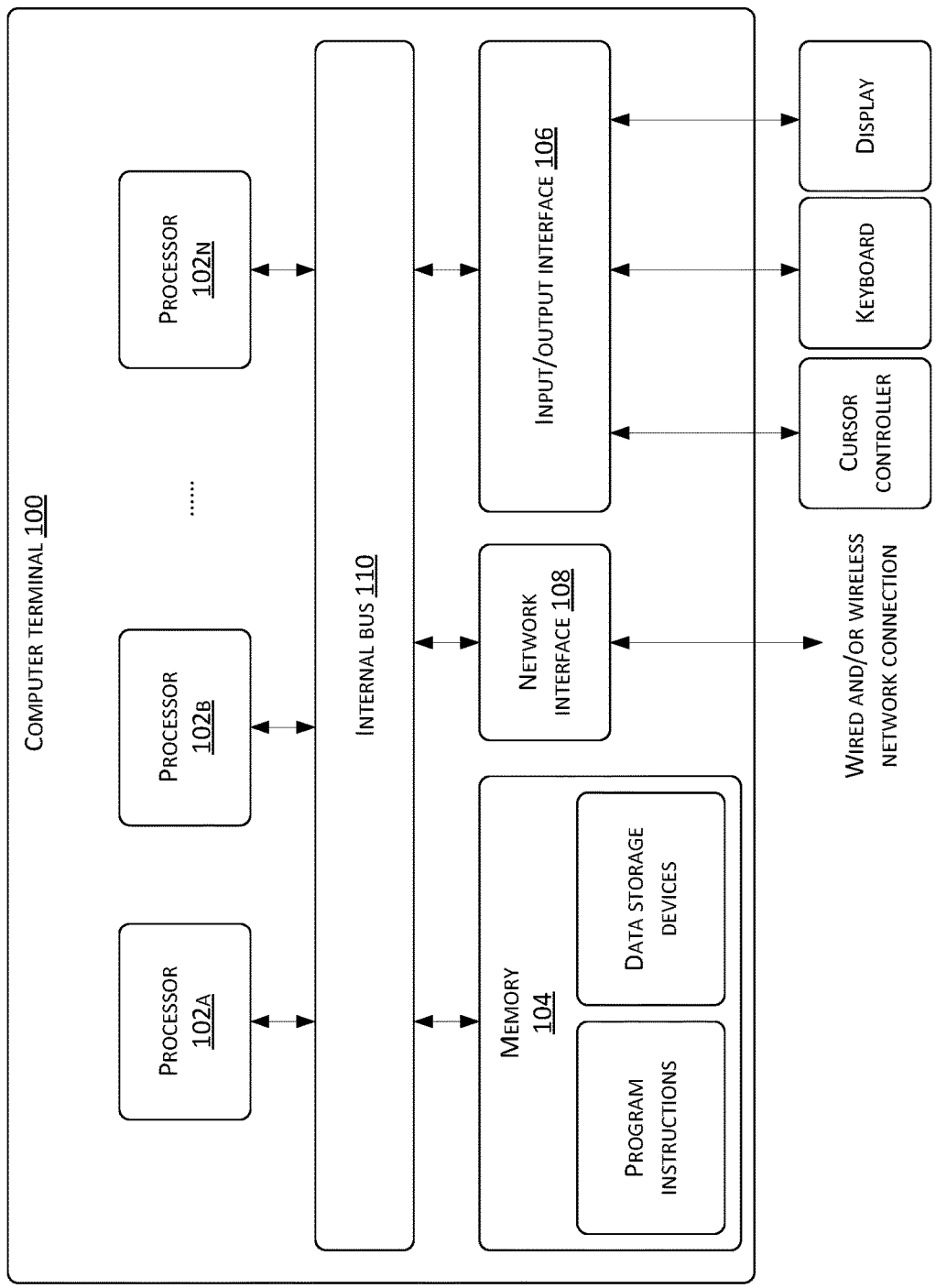
FIG. 1 is a block diagram showing a hardware structure of a computer terminal (or mobile device) used for implementing a key processing method according to the embodiments of the present disclosure.

In order to enable one skilled in the art to understand technical solutions of the present disclosure in a better manner, the technical solutions in implementations are clearly and completely described hereinafter with reference to the accompanying drawings in implementations. Apparently, the described embodiments merely represent some and not all of the embodiments of the present disclosure. All other embodiments obtained by one of ordinary skill in the art based on the embodiments of the present disclosure without making any inventive effort shall fall within the scope of protection of the present disclosure.

It is to be understood that terms "first", "second" and the like in the specification and claims of the present disclosure are used to distinguish between similar objects, and are not necessarily used to describe a particular order or sequence. It is to be understood that data so used may be interchanged whenever appropriate, so that the embodiments of the application described herein can be implemented in an order other than those illustrated or described herein. In addition, terms "including", "containing" and their variants are intended to cover a non-exclusive inclusion. For example, a process, method, system, product, or device that includes a series of operations or units is not necessarily limited to these operations or units that are explicitly listed, but may also include other operations or units that are not explicitly listed or that are inherent to such processes, methods, products, or devices.

First, some nouns or terms that appear when the embodiments of the present disclosure are described are applicable to the following explanations:

Trusted Computing: Trusted Computing is a trusted computing platform supported by hardware security modules in computing and communication systems to improve the overall security of a system.

Trusted Platform Module/Trusted Platform Control Module (TPM/TPCM): A security chip that provides integrity and authenticity for evidence, and is in general physically bound to a computing platform.

Trusted measurement: A practical method of a trusted measurement is an integrity measurement. The integrity measurement is to calculate a hash value of a code using a hash function, compare a stored hash value therewith to determine whether the code is changed, and make a corresponding judgment according to a comparison result by a system.

Trusted dynamic measurement: A trusted measurement that is performed dynamically for a measurement target in response to receiving any trusted measurement request.

Trusted high-speed Data Encryption Card (or abbreviated as THSDC): A data encryption card with trusted functions.

Power Management Kit (PMK): used to record all raw information of user operations to facilitate user modifications.

First Embodiment

According to the embodiments of the present disclosure, an embodiment of a key processing method is provided. It should be noted that operations shown in a flowchart of the accompanying drawings may be executed in a computer system such as a set of computer executable instructions. Although a logical order is shown in a flowchart, in some cases, operations shown or described therein may be performed in a different order than the one described therein.

The method embodiment provided by the first embodiment of the present disclosure can be executed in a mobile terminal, a computer terminal, or other similar computing apparatuses. FIG. 1 shows a structural block diagram of hardware of a computer terminal (or mobile device) used for implementing a key processing method. As shown in FIG. 1, the computer terminal 100 (or mobile device 100) may include one or more (102a, 102b, . . . , 102n shown in the figure) processors 102 (the processor 102 may include, but is not limited to, a processing device such as a microprocessor MCU or a programmable logic device FPGA), or a memory 104 used for storing data. In addition, the computer terminal 100 may further include: an input/output interface (I/O interface) 106, a universal serial bus (USB) port (which may be included as one of the ports of the I/O interface), a network interface 108, and an internal bus 110. In implementations, the computer terminal 100 may further include a transmission module, a display, a power source, and/or a camera. One skilled in the art can understand that the structure shown in FIG. 1 is merely illustrative, and does not limit the structure of the above electronic device. For example, the computer terminal 100 may also include more or fewer components than those shown in FIG. 1, or have a different configuration than the one shown in FIG. 1.

It should be noted that one or more of the processors 102 and/or other data processing circuits may be referred to herein generally as "data processing circuits". The data processing circuit may be embodied in whole or in part as software, hardware, firmware or any other combination. Moreover, the data processing circuit can be a single and separate processing module, or incorporated in whole or in part into any of the other components in the computer terminal 100 (or mobile device). As involved in implementations, the data processing circuit is used as a processor control (e.g., a selection of a variable resistance terminal path connected to an interface).

The memory 104 can be used to store software programs and modules of application software, such as program instructions/data storage devices corresponding to the key processing methods in implementations. The processor(s) 102 perform(s) various functions, applications, and data processing by running software program(s) and module(s) stored in the memory 104, thereby implementing the key processing methods. The memory 104 may include high speed random access memory, and may also include non-volatile memory such as one or more magnetic storage devices, flash memory, or other non-volatile solid state memory. In some examples, the memory 104 may further include storage devices remotely located relative to processor(s) 102. These remote storage devices may be connected to the computer terminal 100 via a network. Examples of such network include, but are not limited to, the Internet, an intranet, a local area network, a mobile communication network, and a combination thereof.

The transmission module is used for receiving or sending data via a network. Specific examples of the network may include a wireless network provided by a communication provider of the computer terminal 100. In an example, the transmission module includes a Network Interface Controller (NIC) that can be connected to other network devices through a base station to communicate with the Internet. In an example, the transmission module can be a Radio Frequency (RF) module used for communicating with the Internet wirelessly.

The display can be, for example, a touch screen liquid crystal display (LCD) that enables a user to interact with a user interface of the computer terminal 100 (or mobile device).

In order to ensure the integrity, confidentiality and security of information data and information systems, high-speed encryption cards or security chips that can be applied to various types of cryptographic security application systems are commonly used for encryption/decryption in existing technologies.

Figure 2:
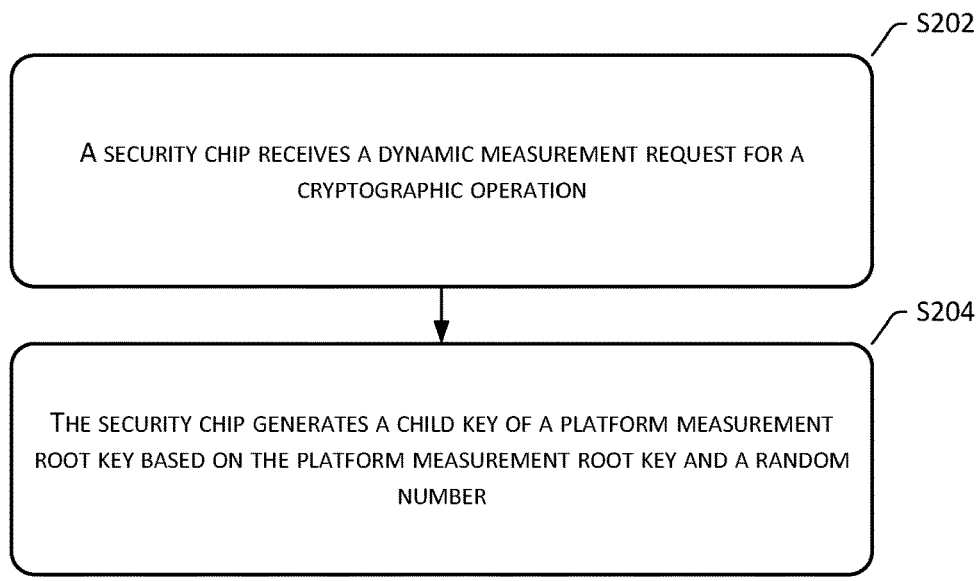
FIG. 2 is a flowchart of a key processing method according to the embodiments of the present disclosure.

In the above operating environment, the present disclosure provides a key processing method as shown in FIG. 2. FIG. 2 is a flowchart of a key processing method 200 according to the embodiments of the present disclosure. As shown in FIG. 2, the method 200 includes the following operations.

S202: A security chip receives a dynamic measurement request for a cryptographic operation.

In implementations, the security chip may be a TPCM trusted chip, a trusted encryption card, a trusted high-speed encryption card, etc., and has a function that implements platform trusted booting from a time of starting a machine to a time before a loading of an operating system kernel, which can ensure the computational security of encryption and decryption of sensitive data of services, and can guarantee the security and legitimacy of each platform and identity during a process of interacting with external devices.

In implementations, a TPCM trusted chip is taken as an example of the security chip. A terminal device (for example, a computer terminal, a mobile terminal) of a user may initiate a dynamic measurement request for a cryptographic operation to a TPCM trusted chip through, but not limited to, a trusted software base (TSB), or a Trusted Software Stack (TSS).

In implementations, the measurement request for the cryptographic operation includes a user platform identity certificate of a user and a first random number.

The above dynamic measurement request may be information in a following format: $\{U, AIK_{cert}, n1\}$; wherein U is used to represent a name of a user U, $AIK_{Cert}$ is used to represent a user platform identity certificate, and n1 is a random number that is randomly generated by a system to protect against attacks during a process of responding the above dynamic measurement request.

In implementations, the TPCM trusted chip and the trusted software base/trusted software stack may conduct command and data interactions through, but not limited to, a PCIe interface or a serial peripheral interface SPI bus. The trusted software base/trusted software stack may be configured in an application (APP) or an operating system (OS) in an external device.

S204: The security chip generates a child key of a platform measurement root key based on the platform measurement root key and a random number.

At S204, the child key of the platform measurement root key is used for encrypting a loading process and an execution process measured by a dynamic measurement module, and the dynamic measurement module is a module used for measuring a firmware that performs cryptographic operations.

In implementations, a random number generator functional module in the security chip may generate a second random number n2, and generate a child key Root_Skey of a platform measurement root key Root_Key based on the platform measurement root key, the first random number n1, and the second random number n2.

It should be noted that the child key Root_Skey of the platform measurement root key can be inferred from the platform measurement root key Root_Key, the first random number n1 and the second random number n2, but the platform measurement root key Root_Key cannot be reversely inferred from the child key Root_Skey of the platform measurement root key.

Using the key processing method provided by the embodiments of the present disclosure, a security chip receives a dynamic measurement request for a cryptographic operation. The security chip generates a child key of a platform measurement root key based on the platform measurement root key and a random number, wherein the child key of the platform measurement root key is used to encrypt a loading process and an execution process measured by a dynamic measurement module, and the dynamic measurement module is a module used for measuring a firmware that performs cryptographic operations.

It is easy to note that in a dynamic measurement process of a high-speed cryptographic operation, loading and measurement of a dynamic measurement module can be ensured to be trusted in the cryptographic operation through a participation of a child key of a platform measurement root key. Through a participation of a user's cryptographic operation measurement key, the integrity of a cryptographic algorithmic firmware and the credibility of a cryptographic operation execution environment can be guaranteed.

Therefore, the embodiments of the present disclosure achieve the purpose of ensuring the credibility of loading and measurement of a dynamic measurement module in a cryptographic operation, thereby realizing technical effects of ensuring the integrity of a cryptographic algorithm firmware and the credibility of a cryptographic operation execution environment in a process of user cryptographic operation, and further solving the technical problems that the existing key processing methods cannot guarantee the integrity of cryptographic algorithmic firmware and the credibility of cryptographic operation execution environments in a process of cryptographic operation.

In implementations, the random number includes a first random number and a second random number, wherein the first random number is used to prevent a process of responding the request from being attacked, and the second random number is used to generate the child key of the platform measurement root key.

In implementations, the first random number is included in the dynamic measurement request for the cryptographic operation, and the second random number is generated by the security chip.

In the foregoing optional embodiment, the first random number is a random number included in the dynamic measurement request for the cryptographic operation, and is used to prevent a process of responding the request from being attacked. The second random number is generated by a random number generator functional module in the security chip, and is used together with the first random number and the platform measurement root key to generate the child key of the platform measurement root key.

In implementations, the method further includes: the security chip transmitting the child key of the platform measurement root key to the cryptographic operation chip, so that the cryptographic operation chip sets the child key of platform measurement root key in a local storage device in advance before the cryptographic operation is performed.

In implementations, in implementations, the security chip may transmit the child key of the platform measurement root key to the cryptographic operation chip through an internal circuit board, wherein the cryptographic operation chip may be a high-speed cryptographic operation chip, or a trusted high-speed cryptographic operation chip.

The local storage device of the cryptographic operation chip may be firmware or a flash memory, and the cryptographic operation chip may place the received child key of the platform measurement root key in the firmware or the flash memory beforehand to help performing cryptographic operations.

In an optional implementation, a data format of the child key of the platform measurement root key may be $\{EK_{Cert}, Root\_Skey, n1\}_{PMK-1}$.

In implementations, the method further includes: the security chip storing the child key of the platform measurement root key in the local storage device.

In implementations, the local storage device of the security chip may be a firmware or a flash memory. It should be noted that the child key of the platform measurement root key may or may not be stored in the security chip in implementations.

In implementations, the method further includes: when the child key of the platform measurement root key is not stored in the local storage device of the security chip, and another request from a user corresponding to the dynamic measurement request for the cryptographic operation is received, the security chip determining the child key of the platform measurement root key according to user information of the user and the first random number, and a fourth random number that is determined based on the first random number.

In implementations, the user information may be a user name.

In implementations provided by the present disclosure, if the child key of the platform measurement root key is not stored in the local storage device of the security chip, the child key of the platform measurement root key can be recalculated based on the user name in the user information, the first random number, and the fourth random number in response to receiving another request from the user corresponding to the dynamic measurement request for the cryptographic operation.

The fourth random number has the same effect as that of the second random number, and a value of the fourth random number and a value of the second random number may be the same or different. Furthermore, the fourth random number is calculated and obtained through an algorithm using the first random number.

In implementations, after the fourth random number is calculated based on the first random number, when the user sends the dynamic measurement request for the cryptographic operation again, the dynamic measurement request for the cryptographic operation only needs to include the user name and the first random number in order for the security chip to calculate and obtain the child key of the platform measurement root key. The cryptographic operation chip decrypts data information transmitted by the security chip through a PMK management tool, and verifies the legitimacy of the first random number and $EK_{Cert}$.

Figure 3:
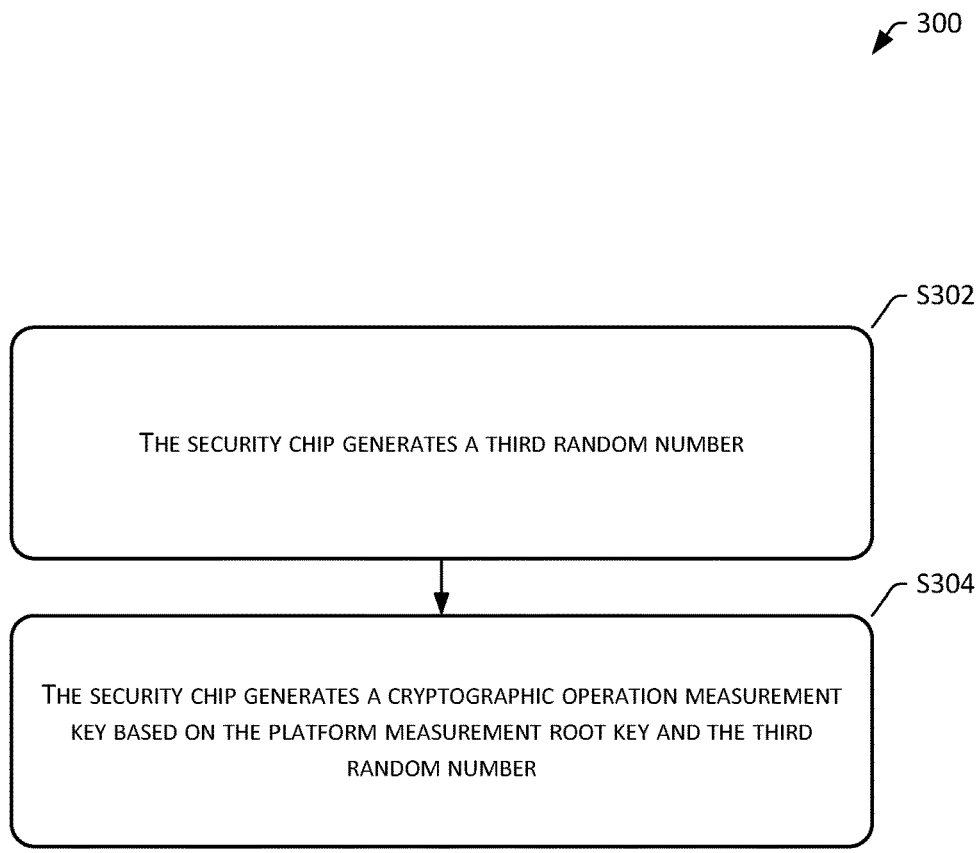
FIG. 3 is a flowchart of an optional key processing method according to the embodiments of the present disclosure.

In implementations, FIG. 3 is a flowchart of an optional key processing method 300 according to the embodiments of the present disclosure. As shown in FIG. 3, in addition or alternative to the operations of the method 200 in FIG. 2, the method 300 may further include the following operations:

S302: The security chip generates a third random number.

S304: The security chip generates a cryptographic operation measurement key based on the platform measurement root key and the third random number.

At S304, the cryptographic operation measurement key is used for encrypting a loading process and an execution process of a cryptographic operation measurement.

In implementations, the third random number may be generated by, but not limited to, the random number generator functional module in the security chip. A cryptographic operation measurement key DM_key of the user is generated based on the platform measurement root key and the third random number.

It should be noted that, in implementations, the cryptographic operation measurement key may be inferred based on the platform measurement root key and the third random number. However, the platform measurement root key cannot be reversely deduced based on the cryptographic operation measurement key. Furthermore, the cryptographic operation measurement key of the user may be generated based on the platform measurement root key and the third random number according to different algorithms.

In implementations, the method further includes: the security chip transmitting the cryptographic operation measurement key to a terminal device, wherein the terminal device is a device that initiates the dynamic measurement request for the cryptographic operation. In other words, the user may initiate the dynamic measurement request for the cryptographic operation through the terminal device.

In implementations, a data format of the cryptographic operation measurement key may be $\{E_{Kcert}, (n3, n1\text{-}1), DM\_key\}_{AIK}$.

After the security chip generates the user's cryptographic operation measurement key, the security chip may transmit the cryptographic operation measurement key to the terminal device that initiates the dynamic measurement request for the cryptographic operation.

In implementations, after the security chip receives the dynamic measurement request for the cryptographic operation, the method further includes:

the security chip authenticating a user based on a user platform identity certificate corresponding to the dynamic measurement request for the cryptographic operation if the dynamic measurement request for the cryptographic operation received by the security chip includes the user platform identity certificate corresponding to the dynamic measurement request for the cryptographic operation, and allowing a dynamic measurement of the cryptographic operation to be performed upon successful authentication.

In implementations, if the dynamic measurement request for the cryptographic operation received by the security chip includes the user platform identity certificate, a cryptographic authentication command processing functional module in the security chip can perform authentication on the legitimacy of an identity of the user by verifying the validity of the user platform identity certificate or by means of a password, after the dynamic measurement request for the cryptographic operation is received.

In implementations, if the authentication fails, the security chip rejects the user's dynamic measurement request for high-speed cryptographic operation. If the authentication is passed, the security chip allows a dynamic measurement for the cryptographic operation to be performed. For example, an active measurement functional module in the security chip may be used to actively measure the integrity of a dynamic measurement module in a memory of a high-speed cryptographic operation chip through a SPI interface, or a PCIE interface.

Figure 4:
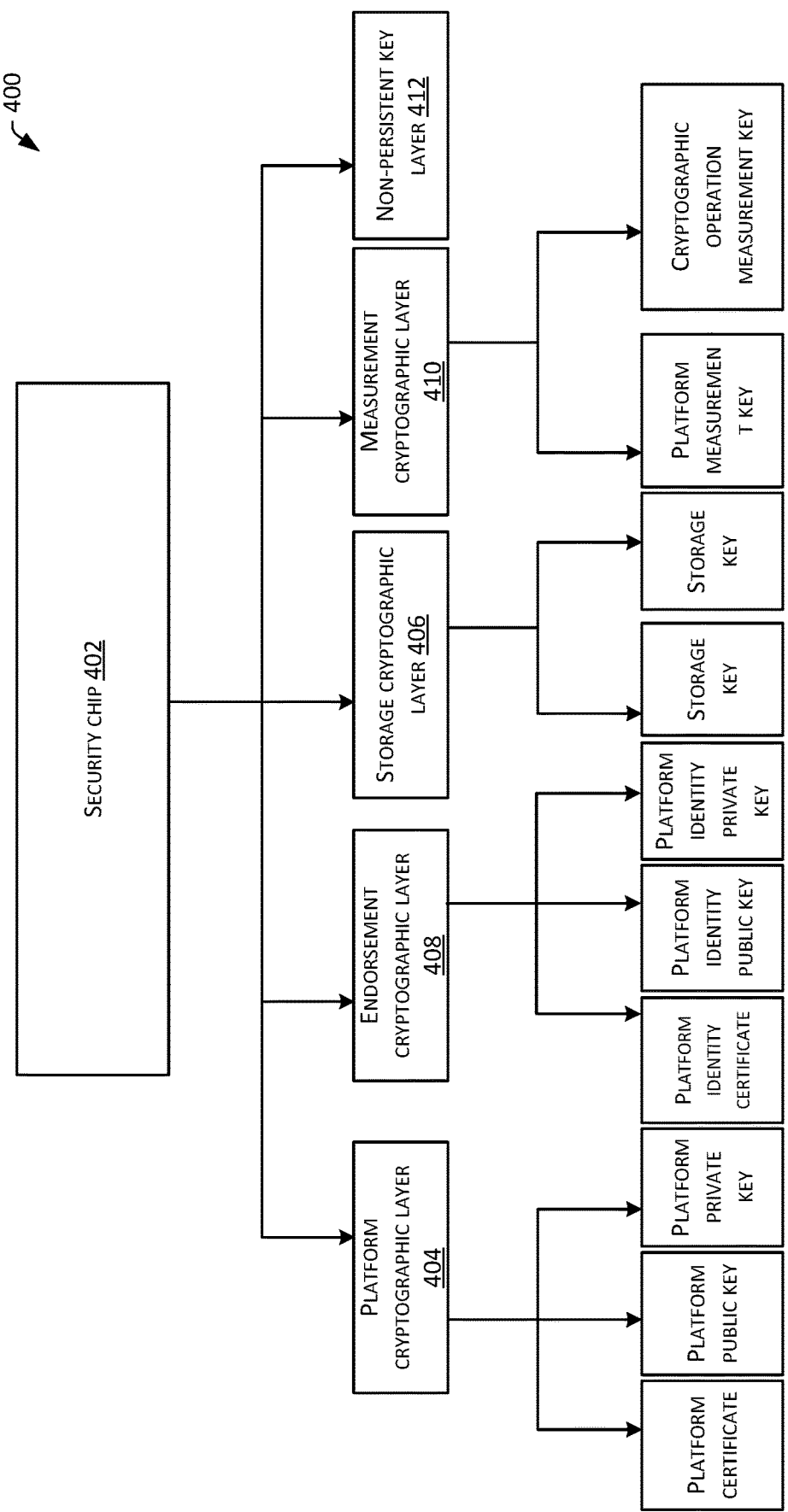
FIG. 4 is a schematic diagram of an optional key management system according to the embodiments of the present disclosure.

In implementations, the security chip can use four persistent key layer structures to support different instances. Different key layers have independent access authorization controls (authorization passwords and policies), separate administrators and slightly different methods of operations. FIG. 4 is a schematic diagram of an optional key management system 400 according to the embodiments of the present disclosure. As shown in FIG. 4, a security chip 402 may include, but not limited to, the following key layers: a platform cryptographic layer structure (Platform Hierarchy) 404, a storage cryptographic layer structure (Storage Hierarchy) 406, an endorsement cryptographic layer structure (Endorsement Hierarchy) 408, a measurement key cryptographic layer structure 410, and a non-persistent key layer (Null Hierarchy) 412.

The Null Hierarchy is different from the persistent key layers, with its authorization key and policy being null, and is cleared after restart.

Authorization handle access control for each persistent key layer structure is exemplarily described as follows:

A structure handle of a platform cryptographic layer, TPM_RH_Platform, is generally provided to a platform's original equipment manufacturer. A usual practice is to allocate the structure handle of the platform cryptographic layer by a basic input/output system (BIOS), which is not visible upward. As shown in FIG. 4, the platform cryptographic layer includes: a platform certificate, a platform public key, and a platform private key, wherein, one platform has a unique pair of platform public and private keys, and the platform certificate includes: attribute-related information of a trusted platform control module/trusted platform module (TPM/TPCM), for example, TPM_id|HSDEC_id, TPM-HSDEC_Public-key, and so on.

A structure handle of a storage cryptographic layer, TPM_RH_OWNER: an owner password in the storage cryptographic layer is provided to a platform owner, an IT operation and maintenance department, or a service party for uses. The storage cryptographic layer is used by service parties, and different service parties can create their own master keys SRKs (storage root keys, also called PSKs, primary storage keys) at this layer for generating and protecting respective service keys.

A structure handle of an authentication cryptographic layer, TPM_RH_ENDORSEMENT: an endorse password of an authorization key in the authentication cryptographic layer is mainly used for platform authentication, and the authentication cryptographic layer includes: a platform identity certificate, a platform identity public key, and a platform identity private key, with one platform potentially having multiple pairs of platform identity public and private keys.

A measurement cryptographic layer includes: a platform measurement key and a cryptographic operation measurement key of the user, wherein the platform measurement key is used to participate in integrity verification of a platform and a system; and the cryptographic operation measurement key is used to participate in verifying a user during a process of cryptographic operation, and is used to verify the integrity of a loaded firmware that is associated with the cryptographic operation. Regarding of an integrity measurement of a platform firmware or a measurement of a user's cryptographic operation, a measurement key is used to ensure that a measurement of a corresponding firmware is a measurement performed using a correct hash function adopted by a legitimate user. For example, a measurement body performs a measurement using a HMAC function.

Figure 5:
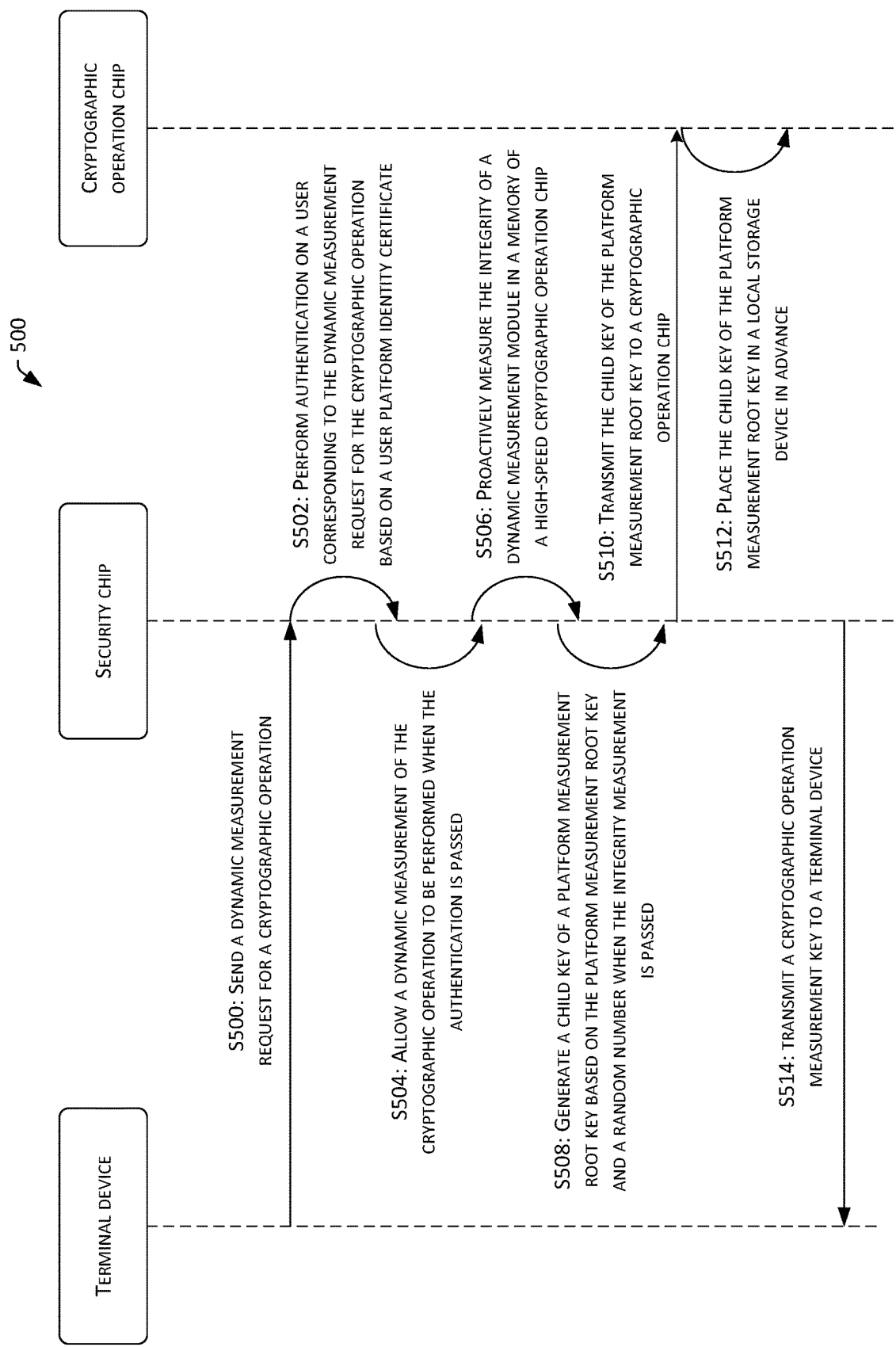
FIG. 5 is a schematic diagram of a scenario of a key processing method according to the embodiments of the present disclosure.

FIG. 5 is a schematic diagram of a scenario of a key processing method 500 according to the embodiments of the present disclosure. As shown in FIG. 5, the above key processing method 500 may be implemented by the following operations.

S500: A terminal device sends a dynamic measurement request for a cryptographic operation.

In implementations, the terminal device can be a computer terminal or a mobile terminal.

A TPCM trusted chip is taken as an example of the above security chip. A user's terminal device (for example, a computer terminal, a mobile terminal) can initiate a dynamic measurement request for a cryptographic operation to a TPCM trusted chip through, but not limited to, a trusted software base (TSB), or a Trusted Software Stack (TSS).

S502: A security chip performs authentication on a user corresponding to the dynamic measurement request for the cryptographic operation based on a user platform identity certificate.

At S502, the security chip may be a TPCM trusted chip, a trusted encryption card, a trusted high-speed encryption card, etc., and has a function that implements platform trusted booting from a time of starting a machine to a time before a loading of an operating system kernel, which can ensure the computational security of encryption and decryption of sensitive data of services, and can guarantee the security and legitimacy of each platform and identity during a process of interacting with external devices.

In implementations, when the dynamic measurement request for the cryptographic operation includes a user platform identity certificate, the security chip performs authentication on a user corresponding to the dynamic measurement request for the cryptographic operation according to the user platform identity certificate.

An identity of the user may be authenticated by verifying the validity of the user platform identity certificate, or using a password.

S504: The security chip allows a dynamic measurement of the cryptographic operation to be performed when the authentication is passed.

S506: The security chip proactively measures the integrity of a dynamic measurement module in a memory of a high-speed cryptographic operation chip.

At S504 to S506, when the authentication is passed, the security chip allows a dynamic measurement of the cryptographic operation to be performed. For example, an active measurement function module in the security chip can be used to actively measure the integrity of a dynamic measurement module in a memory of a high-speed cryptographic operation chip through a SPI interface or a PCIE interface.

S508: The security chip generates a child key of a platform measurement root key based on the platform measurement root key and a random number when the integrity measurement is passed.

At S508, the child key of the platform measurement root key is used to encrypt a loading process and an execution process measured by the dynamic measurement module, and the dynamic measurement module is a module used for measuring a firmware that performs cryptographic operations.

In implementations, the random number includes a first random number and a second random number, and the child key of the platform measurement root key may be generated based on the platform measurement root key, the first random number, and the second random number.

S510: The security chip transmits the child key of the platform measurement root key to a cryptographic operation chip.

In implementations, the security chip may transmit the child key of the platform measurement root key to the cryptographic operation chip through an internal circuit board, wherein the cryptographic operation chip may be a high-speed cryptographic operation chip or a trusted high-speed cryptographic operation chip.

S512: The cryptographic operation chip places the child key of the platform measurement root key in a local storage device in advance.

At S512, the local storage device of the cryptographic operation chip may be a firmware or a flash memory. The cryptographic operation chip may place the received child key of the platform measurement root key in the firmware or the flash memory in advance to facilitate an execution of the cryptographic operation.

S514: The security chip transmits a cryptographic operation measurement key to a terminal device.

It is easy to note that in a dynamic measurement process of a high-speed cryptographic operation, loading and measurement of a dynamic measurement module can be ensured to be trusted in the cryptographic operation through a participation of a child key of a platform measurement root key. Through a participation of a user's cryptographic operation measurement key, the integrity of a cryptographic algorithmic firmware and the credibility of a cryptographic operation execution environment can be guaranteed.

Therefore, the embodiments of the present disclosure achieve the purpose of ensuring the credibility of loading and measurement of a dynamic measurement module in a cryptographic operation, thereby realizing technical effects of ensuring the integrity of a cryptographic algorithm firmware and the credibility of a cryptographic operation execution environment in a process of user cryptographic operation, and further solving the technical problems that the existing key processing methods cannot guarantee the integrity of cryptographic algorithmic firmware and the credibility of cryptographic operation execution environments in a process of cryptographic operation.

Second Embodiment

Another embodiment of a key processing method is also provided in accordance with the embodiments of the present disclosure. It should be noted that operations illustrated in a flowchart of the drawings may be performed in a computer system such as a set of computer executable instructions. Also, although a logical order is shown in a flowchart, in some cases, operations shown or described therein may be performed in an order different than the one described herein.

Figure 6:
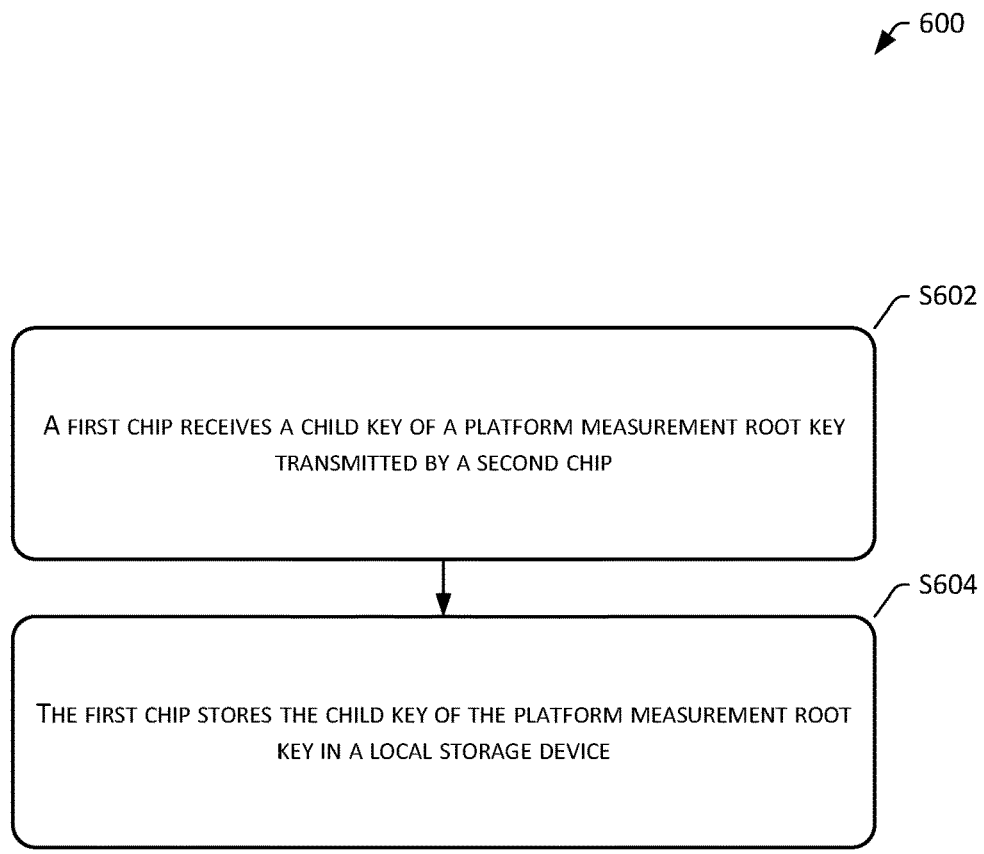
FIG. 6 is a flowchart of another key processing method according to an embodiment of the present disclosure.

In the above operating environment, the present disclosure provides another key processing method as shown in FIG. 6. FIG. 6 is a flowchart of another key processing method 600 according to the embodiments of the present disclosure. As shown in FIG. 6, the method 600 includes the following operations.

S602: A first chip receives a child key of a platform measurement root key transmitted by a second chip.

At S602, the child key of the platform measurement root key is generated by the second chip based on the platform measurement root key and a random number. The child key of the platform measurement root key is used to encrypt a loading process and an execution process measured by a dynamic measurement module, and the dynamic measurement module is a module used for measuring a firmware that performs cryptographic operations.

In implementations, the first chip is used to perform a cryptographic operation on data, and may be, for example, but is not limited to, any one of the following cryptographic operation chips: a high-speed cryptographic operation chip, or a trusted high-speed cryptographic operation chip. The second chip is used for performing secure encryption and secure authentication on the data, and may be, but is not limited to, any of the following security chips: a TPCM trusted chip, a trusted encryption card, a trusted high-speed encryption card, etc.

It should be noted that the second chip has a function that implements platform trusted booting from a time of starting a machine to a time before a loading of an operating system kernel, which can ensure the computational security of encryption and decryption of sensitive data of services, and can guarantee the security and legitimacy of each platform and identity during a process of interacting with external devices.

In implementations, a TPCM trusted chip is taken as an example of the second chip. A terminal device (for example, a computer terminal, a mobile terminal) of a user may initiate a dynamic measurement request for a cryptographic operation to a TPCM trusted chip through, but not limited to, a trusted software base (TSB), or a Trusted Software Stack (TSS).

In implementations, the random number includes a first random number and a second random number. The first random number is included in a dynamic measurement request for the cryptographic operation, and is used to prevent a process of responding the request from being attacked. The second random number is generated by the second chip, and is used for generating the child key of the platform measurement root key.

In implementations, a random number generator functional module in the second chip may generate the second random number, and generate the child key of the platform measurement root key based on the platform measurement root key, the first random number, and the second random number.

S604: The first chip stores the child key of the platform measurement root key in a local storage device.

In implementations, in implementations, the second chip may transmit the child key of the platform measurement root key to the first chip through an internal circuit board. In implementations, the local storage device of the first chip may be a firmware or a flash memory, and the first chip may place the child key of the received platform measurement root key in the firmware or the flash memory in advance to facilitate an execution of the cryptographic operation.

By using the key processing method provided by the embodiments of the present disclosure, a child key of a platform measurement root key transmitted by a second chip is received by a first chip. The child key of the platform measurement root key is generated by the second chip based on the platform measurement root key and a random number. The child key of the platform measurement root key is used to encrypt a loading process and an execution process measured by a dynamic measurement module, and the dynamic measurement module is a module used for measuring a firmware that performs cryptographic operations. The first chip stores the child key of the platform measurement root key in a local storage device.

It is easy to note that in a dynamic measurement process of a high-speed cryptographic operation, loading and measurement of a dynamic measurement module can be ensured to be trusted in the cryptographic operation through a participation of a child key of a platform measurement root key. Through a participation of a user's cryptographic operation measurement key, the integrity of a cryptographic algorithmic firmware and the credibility of a cryptographic operation execution environment can be guaranteed.

Therefore, the embodiments of the present disclosure achieve the purpose of ensuring the credibility of loading and measurement of a dynamic measurement module in a cryptographic operation, thereby realizing technical effects of ensuring the integrity of a cryptographic algorithm firmware and the credibility of a cryptographic operation execution environment in a process of user cryptographic operation, and further solving the technical problems that the existing key processing methods cannot guarantee the integrity of cryptographic algorithmic firmware and the credibility of cryptographic operation execution environments in a process of cryptographic operation.

In implementations, the method further includes:

S702: The first chip receives a measurement request for a cryptographic algorithm transmitted by the second chip.

The measurement request for the cryptographic algorithm includes a user platform identity certificate of a user and a first random number.

In implementations, such dynamic measurement request may be information in the following format: {U, $AIK_{cert}$, n1}; wherein U is used to represent a name of a user U, $AIK_{Cert}$ is used to represent a user platform identity certificate, and n1 is a random number randomly generated by a system, and is used for protecting against attacks during a process of responding the dynamic measurement request.

S704: The first chip verifies the validity of a first random number, and verifies the legitimacy of an identity of a user based on a user platform identity certificate.

In implementations, the first chip decrypts data information transmitted by the second chip using a PMK management tool, so that the validity of the first random number can be verified.

In another optional embodiment, the method further includes:

S802: The first chip receives a cryptographic operation measurement key transmitted by the second chip.

The cryptographic operation measurement key is used to encrypt a loading process and an execution process of a cryptographic operation measurement, and the cryptographic operation measurement key is generated by the second chip based on the platform measurement root key and a third random number. The third random number is generated by the second chip.

S804: The first chip stores the cryptographic operation measurement key in the local storage device.

In implementations, the third random number may be generated by, but not limited to, the random number generator functional module in the second chip, and the cryptographic operation measurement key of the user is generated based on the platform measurement root key and the third random number.

It should be noted that the cryptographic operation measurement key may be inferred based on the platform measurement root key and the third random number in implementations. However, the platform measurement root key cannot be reversely deduced based on the cryptographic operation measurement key. Furthermore, the cryptographic operation measurement key of the user can be generated based on the platform measurement root key and the third random number using different algorithms.

In implementations, the second chip can transmit the cryptographic operation measurement key to the first chip through the internal circuit board, and the first chip can place the received cryptographic operation measurement key to the firmware or the flash memory in advance in order to help performing cryptographic operations.

It should be noted that the foregoing method embodiments are all expressed as series of combinations of actions for the sake of simple description. However, one skilled in the art should understand that the present disclosure is not limited by the described orders of actions, because certain operations may be performed in other orders or in parallel in accordance with the present disclosure. Furthermore, one skilled in the art should also understand that the embodiments described in the specification are all preferred embodiments, and actions and modules involved therein are not necessarily needed by the present disclosure.

Through the description of the above embodiments, one skilled in the art can clearly understand that the methods according to the above embodiments can be implemented by means of software plus a necessary general hardware platform, and apparently can also be implemented by hardware. However, in many cases, the former is a better implementation. Based on such understanding, the essence of the technical solutions of the present disclosure, or the parts that make contributions to the existing technologies, may be embodied in a form of a software product. Such computer software product is stored in a storage medium (such as ROM/RAM, a magnetic disk, an optical disk), and includes a plurality of instructions for causing a terminal device (which may be a mobile phone, a computer, a server, or a network device, etc.) to perform the above-described methods of various embodiments of the present disclosure.

Third Embodiment

Figure 7:
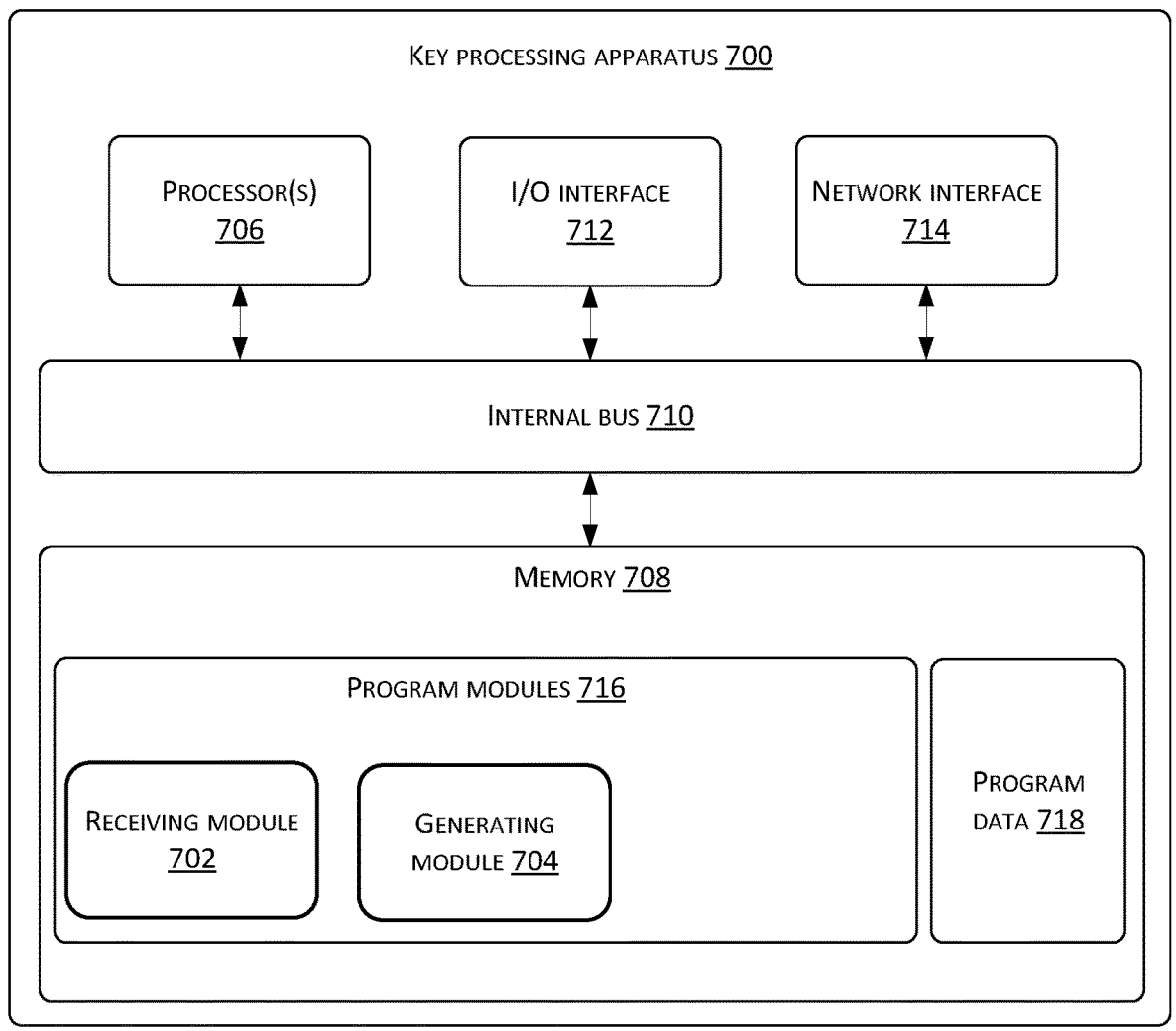
FIG. 7 is a schematic diagram of a key processing apparatus according to the embodiments of the present disclosure.

According to the embodiments of the present disclosure, an embodiment of a key processing apparatus is provided. The key processing apparatus is applied to a security chip. FIG. 7 is a schematic diagram of a key processing apparatus 700 according to the embodiments of the present disclosure. As shown in FIG. 7, the apparatus 700 includes a receiving module 702 and a generating module 704, wherein:

the receiving module 702 is configured to receive a dynamic measurement request for a cryptographic operation, and the generating module 704 is configured to generate a child key of a platform measurement root key based on the platform measurement root key and a random number, wherein the child key of the platform measurements the root key is used to encrypt a loading process and an execution process measured by a dynamic measurement module, and the dynamic measurement module is a module used for measuring a firmware that performs cryptographic operations.

In implementations, the apparatus 700 may further include one or more processors 706, a memory 708, and an internal bus 710. In some implementations, the apparatus 700 may further include an input/output (I/O) interface 712, and a network interface 714.

The memory 708 may include a form of processor readable media such as a volatile memory, a random access memory (RAM) and/or a non-volatile memory, for example, a read-only memory (ROM) or a flash RAM. The memory 708 is an example of a processor readable media.

The processor readable media may include a volatile or non-volatile type, a removable or non-removable media, which may achieve storage of information using any method or technology. The information may include a processor-readable instruction, a data structure, a program module or other data. Examples of processor storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor readable media does not include transitory media, such as modulated data signals and carrier waves.

In implementations, the memory 708 may include program modules 716 and program data 718. The program modules 716 may include one or more modules as described in the foregoing description and shown in FIG. 7.

It should be noted that the receiving module 702 and the generating module 704 correspond to S202 to S204 in the first embodiment, and examples and application scenarios implemented by these two modules are the same as those of the corresponding operations, but are not limited to the content disclosed in the first embodiment. It should be noted that the above modules can be operated as parts of the apparatus in the computer terminal 100 provided in the first embodiment.

It should be noted that preferred implementations of the present embodiment can be referenced to related descriptions in the first and second embodiments, and details thereof are not repeatedly described herein.

Fourth Embodiment

Figure 8:
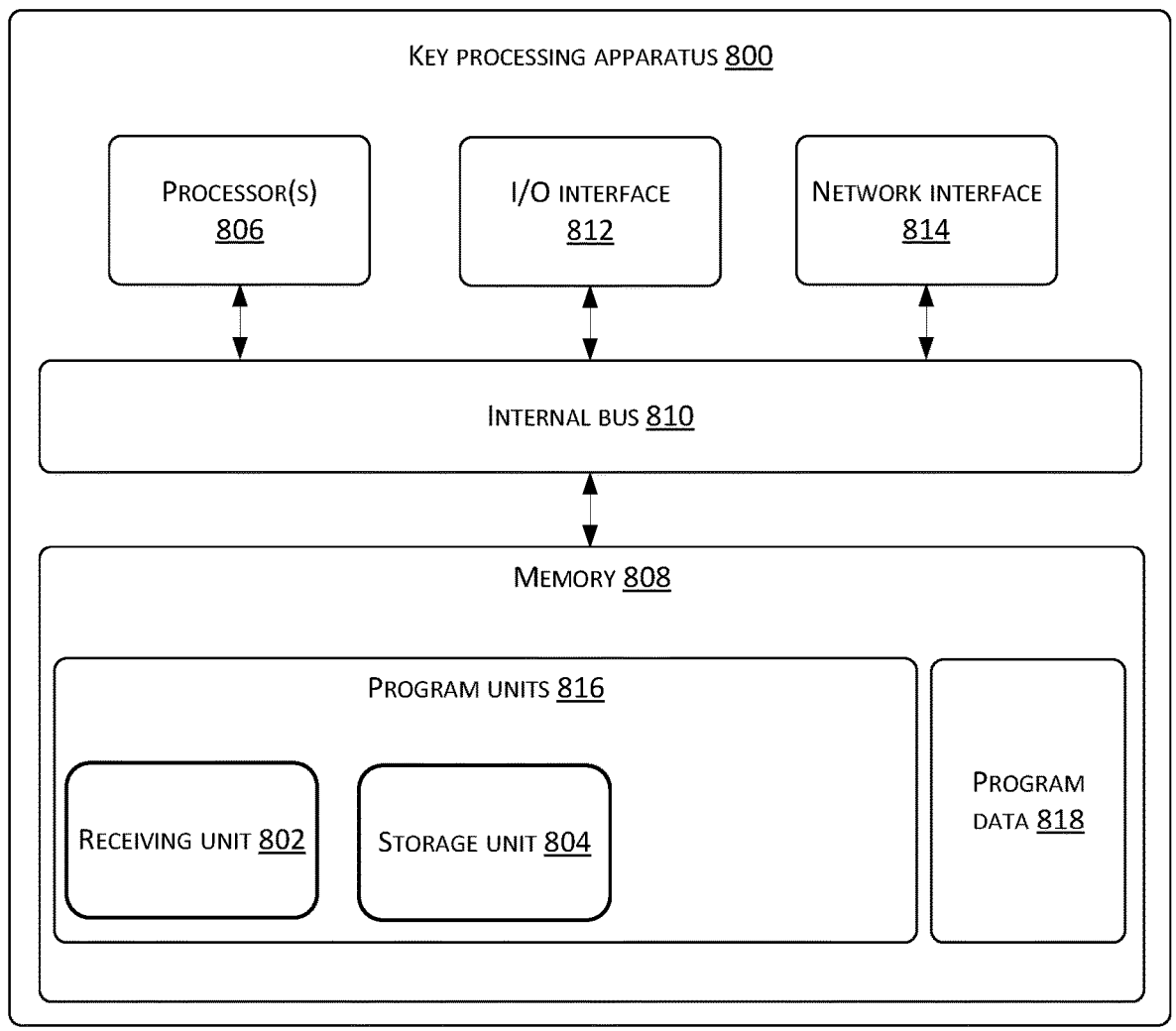
FIG. 8 is a schematic diagram of another key processing apparatus according to the embodiments of the present disclosure.

According to the embodiments of the present disclosure, another embodiment of a key processing apparatus is provided, wherein the key processing apparatus is applied to a cryptographic operation chip. FIG. 8 is a schematic diagram of another key processing apparatus 800 according to the embodiments of the present disclosure. As shown in FIG. 8, the apparatus 800 includes: a receiving unit 802 and a storage unit 804, wherein:

the receiving unit 802 is configured to receive a child key of a platform measurement root key transmitted by a third chip, wherein the child key of the platform measurement root key is generated by the third chip based on the platform measurement root key and a random number, the child key of the platform measurement root key is used to encrypt a loading process and an execution process measured by a dynamic measurement module, and the dynamic measurement module is a module used for measuring a firmware that performs cryptographic operations; and the storage unit 804 is configured to store the child key of the platform measurement root key in a local storage device.

The third chip is used for secure encryption and secure authentication on data, and may be, for example, but is not limited to, any one of the following security chips: a TPCM trusted chip, a trusted encryption card, a trusted high-speed encryption card, or the like.

It should be noted that the third chip has a function that implements platform trusted booting from a time of starting a machine to a time before a loading of an operating system kernel, which can ensure the computational security of encryption and decryption of sensitive data of services, and can guarantee the security and legitimacy of each platform and identity during a process of interacting with external devices.

In implementations, the third chip may be a security chip as described above.

In implementations, the apparatus 800 may further include one or more processors 806, a memory 808, and an internal bus 810. In some implementations, the apparatus 800 may further include an input/output (I/O) interface 812, and a network interface 814. The memory 808 may include a form of processor readable media as described in the foregoing description.

In implementations, the memory 808 may include program units 816 and program data 818. The program units 816 may include one or more units as described in the foregoing description and shown in FIG. 8.

It should be noted that the receiving unit 802 and the storage unit 804 correspond to S602 to S604 in the second embodiment, and examples and application scenarios implemented by these two units are the same as the corresponding operations, but are not limited to the content disclosed in the second embodiment. It should be noted that the above units can be operated as parts of the apparatus in the computer terminal 100 provided in the first embodiment.

It should be noted that preferred implementations of the present embodiment can be referenced to related descriptions in the first and second embodiments, and details thereof are not repeatedly described herein.

Fifth Embodiment

According to the embodiments of the present disclosure, an embodiment of a computer terminal is also provided, which may be any computer terminal of a group of computer terminals. In implementations, the computer terminal may also be replaced with a terminal device such as a mobile terminal.

In implementations, the computer terminal may be located in at least one network device of a plurality of network devices of a computer network.

In implementations, the computer terminal may execute program codes of the following operations in the key processing method: a security chip receiving a dynamic measurement request for a cryptographic operation; and the security chip generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

Figure 9:
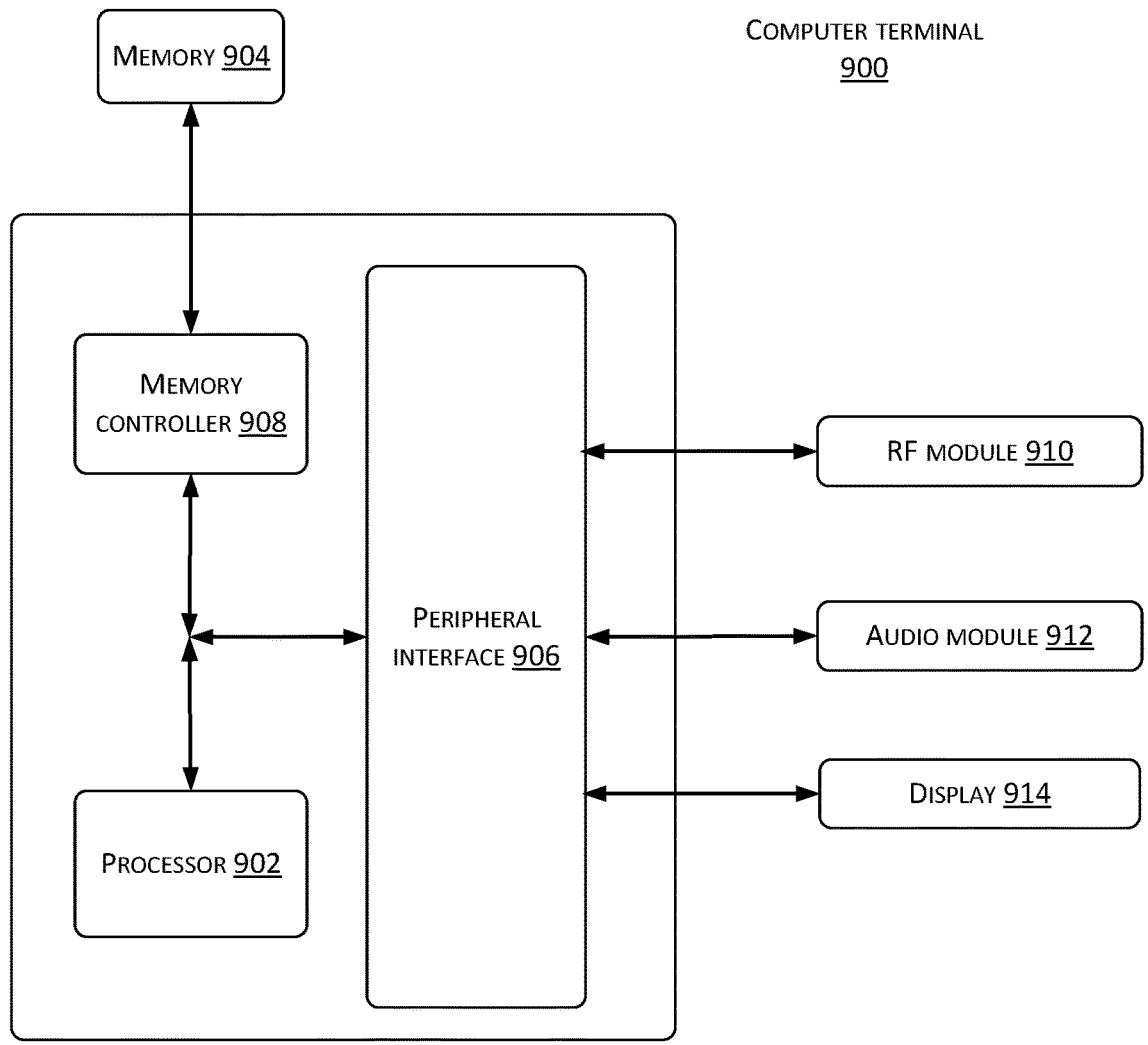
FIG. 9 is a structural block diagram of a computer terminal according to the embodiments of the present disclosure.

In implementations, FIG. 9 is a structural block diagram of a computer terminal 900 according to the embodiments of the present disclosure. As shown in FIG. 9, the computer terminal 900 may include: one or more (only one shown in the figure) processors 902, a memory 904, and a peripheral interface 906. In some implementations, the computer terminal 900 may further include a memory controller 908. In some implementations, the computer terminal 900 may be associated or peripheral with a RF (radio frequency) module 910, an audio module 912, and a display 914.

The memory 904 can be configured to store software programs and modules, such as program instructions/modules corresponding to the cryptographic operation processing methods and apparatuses in implementations. The processor(s) 2 executes various functions, applications and data processing by running software program(s) and module(s) stored in the memory 904, i.e., implementing the above-described cryptographic operation processing methods. The memory 904 may include a high speed random access memory, and may also include non-volatile memory such as one or more magnetic storage devices, a flash memory, or other non-volatile solid state memory. In some examples, the memory can further include storage devices remotely located relative to the processor(s). These storage devices can be connected to the computer terminal 900 via a network. Examples of such network include, but are not limited to, the Internet, an intranet, a local area network, a mobile communication network, and a combination thereof.

The processor(s) may call information and application program(s) stored in the memory through a transmission device to perform the following operations: a security chip receiving a dynamic measurement request for a cryptographic operation; and the security chip generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

In implementations, the processor(s) may further execute program codes of the following operations: the security chip transmitting the child key of the platform measurement root key to a cryptographic operation chip, to allow the cryptographic operation chip to store the child key of the platform measurement root key in a local storage device in advance before the cryptographic operation is performed.

In implementations, the processor(s) may further execute program codes of the following operations: the security chip storing the child key of the platform measurement root key in a local storage device.

In implementations, the processor(s) may further execute program codes of the following operations: the security chip determining the child key of the platform measurement root key based on user information of a user, the first random number, and a fourth random number that is determined based on a first random number in response to receiving another request from the user corresponding to the dynamic measurement request for the cryptographic operation, under a condition that the security chip does not have the child key of the platform measurement root key stored in a local storage device.

In implementations, the processor(s) may further execute program codes of the following operations: the security chip generating a third random number; and the security chip generating a cryptographic operation measurement key based on the platform measurement root key and the third random number, wherein the cryptographic operation measurement key is used to encrypt a loading process and an execution process of a cryptographic operation measurement.

In implementations, the processor(s) may further execute program codes of the following operations: the security chip transmitting the cryptographic operation measurement key to a terminal device, wherein the terminal device is a device that initiates the dynamic measurement request for the cryptographic operation.

In implementations, the processor(s) may further execute program codes of the following operations: under a condition that the dynamic measurement request for the cryptographic operation includes a user platform identity certificate, the security chip performing authentication on the user corresponding to the dynamic measurement request for the cryptographic operation based on the user platform identity certificate, and allowing a dynamic measurement of the cryptographic operation to be performed when the authentication is passed.

In implementations, the processor(s) may further execute program codes of the following operations: a first chip receiving a child key of a platform measurement root key transmitted by a second chip, wherein the child key of the platform measurement root key is generated by the second chip based on the platform measurement root key and a random number, the child key of the platform measurement root key is used to encrypt a loading process and an execution process measured by a dynamic measurement module, and the dynamic measurement module is a module used for measuring a firmware that performs cryptographic operations; and the first chip storing the child key of the platform measurement root key in a local storage device.

In implementations, the processor(s) may further execute program codes of the following operations: the first chip receiving a measurement request for a cryptographic algorithm sent by the second chip, wherein the measurement request for the cryptographic algorithm includes a user platform identity certificate of a user and a first random number; and the first chip verifying the validity of the first random number, and verifying the legitimacy of an identity of the user based on the user platform identity certificate.

In implementations, the processor(s) may further execute program codes of the following operations: a first chip receiving a cryptographic operation measurement key transmitted by a second chip, wherein the cryptographic operation measurement key is used to encrypt a loading process and an execution process of a cryptographic operation measurement, the cryptographic operation measurement key is generated by the second chip based on a platform measurement root key and a third random number, and the third random number is generated by the second chip; and the first chip storing the cryptographic operation measurement key in a local storage device.

Using the embodiments of the present disclosure, a solution of key processing is provided. A security chip is used to receive a dynamic measurement request for a cryptographic operation. The security chip generates a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

Therefore, the embodiments of the present disclosure achieve the purpose of ensuring the credibility of loading and measurement of a dynamic measurement module in a cryptographic operation, thereby realizing technical effects of ensuring the integrity of a cryptographic algorithm firmware and the credibility of a cryptographic operation execution environment in a process of user cryptographic operation, and further solving the technical problems that the existing key processing methods cannot guarantee the integrity of cryptographic algorithmic firmware and the credibility of cryptographic operation execution environments in a process of cryptographic operation.

One skilled in the art can understand that the structure shown in FIG. 9 is merely illustrative, and the computer terminal can also be a smart phone (such as an Android mobile phone, an iOS mobile phone, etc.), a tablet computer, a handheld computer, a mobile Internet device (MID), a PAD, or other terminal devices. FIG. 9 does not limit the structure of the above electronic device. For example, the computer terminal 900 may also include more or fewer components (such as a network interface, a display device, etc.) than those shown in FIG. 9, or have a configuration different from that shown in FIG. 9.

One of ordinary skill in the art may understand that all or part of the operations of the foregoing embodiments may be completed by a program to instruct related hardware of a terminal device. Such program may be stored in a computer readable storage medium, and the storage medium may include: a flash disk, read-only memory (ROM), random access memory (RAM), a magnetic disk, or an optical disk.

Sixth Embodiment

According to the embodiments of the present disclosure, an embodiment of a storage medium is also provided. In implementations, the storage medium may be used to store program codes executed by the key processing method provided in the first embodiment as described above.

In implementations, the storage medium may be located in any computer terminal of a group of computer terminals in a computer network, or in any mobile terminal of a group of mobile terminals.

In implementations, the storage medium is configured to store program codes for performing the following operations: a security chip receiving a dynamic measurement request for a cryptographic operation; and the security chip generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

In implementations, the storage medium is configured to store program codes for performing the following operations: the security chip transmitting the child key of the platform measurement root key to a cryptographic operation chip, to allow the cryptographic operation chip to store the child key of the platform measurement root key in a local storage device in advance before the cryptographic operation is performed.

In implementations, the storage medium is configured to store program codes for performing the following operations: the security chip storing the child key of the platform measurement root key in a local storage device.

In implementations, the storage medium is configured to store program codes for performing the following operations: the security chip determining the child key of the platform measurement root key based on user information of a user, the first random number, and a fourth random number that is determined based on a first random number in response to receiving another request from the user corresponding to the dynamic measurement request for the cryptographic operation, under a condition that the security chip does not have the child key of the platform measurement root key stored in a local storage device.

In implementations, the storage medium is configured to store program codes for performing the following operations: the security chip generating a third random number; and the security chip generating a cryptographic operation measurement key based on the platform measurement root key and the third random number, wherein the cryptographic operation measurement key is used to encrypt a loading process and an execution process of a cryptographic operation measurement.

In implementations, the storage medium is configured to store program codes for performing the following operations: the security chip transmitting the cryptographic operation measurement key to a terminal device, wherein the terminal device is a device that initiates the dynamic measurement request for the cryptographic operation.

In implementations, the storage medium is configured to store program codes for performing the following operations: under a condition that the dynamic measurement request for the cryptographic operation includes a user platform identity certificate, the security chip performing authentication on the user corresponding to the dynamic measurement request for the cryptographic operation based on the user platform identity certificate, and allowing a dynamic measurement of the cryptographic operation to be performed when the authentication is passed.

In implementations, the storage medium is configured to store program codes for performing the following operations: a first chip receiving a child key of a platform measurement root key transmitted by a second chip, wherein the child key of the platform measurement root key is generated by the second chip based on the platform measurement root key and a random number, the child key of the platform measurement root key is used to encrypt a loading process and an execution process measured by a dynamic measurement module, and the dynamic measurement module is a module used for measuring a firmware that performs cryptographic operations; and the first chip storing the child key of the platform measurement root key in a local storage device.

In implementations, the storage medium is configured to store program codes for performing the following operations: the first chip receiving a measurement request for a cryptographic algorithm sent by the second chip, wherein the measurement request for the cryptographic algorithm includes a user platform identity certificate of a user and a first random number; and the first chip verifying the validity of the first random number, and verifying the legitimacy of an identity of the user based on the user platform identity certificate.

In implementations, the storage medium is configured to store program codes for performing the following operations: a first chip receiving a cryptographic operation measurement key transmitted by a second chip, wherein the cryptographic operation measurement key is used to encrypt a loading process and an execution process of a cryptographic operation measurement, the cryptographic operation measurement key is generated by the second chip based on a platform measurement root key and a third random number, and the third random number is generated by the second chip; and the first chip storing the cryptographic operation measurement key in a local storage device.

In implementations, each of the security chip, the cryptographic operation chip, the first chip, the second chip may include one or more processors, a memory, an internal bus, an I/O interface, and a network interface.

The serial numbers of the embodiments of the present disclosure are merely used for description, and do not represent advantages and disadvantages of the embodiments.

In the foregoing embodiments of the present disclosure, descriptions of various embodiments are different, and the parts that are not detailed in a certain embodiment can be referenced to related descriptions of other embodiments.

In a number of embodiments provided by the present disclosure, it should be understood that technical content that is disclosed can be implemented in other manners. The apparatus embodiments described above are merely illustrative. For example, a division of units is only a logical division of functions. In real implementations, other manners of division can exist. For example, multiple units or components may be combined or may be integrated into another system, or some features can be ignored or not executed. In addition, a mutual coupling or a direct coupling or a communication connection that is shown or discussed may be an indirect coupling or communication connection through some interface(s), unit(s) or module(s), and may be in an electrical or other form.

The units described as separate components may or may not be physically separated, and the components displayed as units may or may not be physical units, i.e., may be located in one place, or may be distributed among multiple network units. Some or all of the units may be selected according to actual needs to achieve the purpose of the solutions of the embodiments.

In addition, various functional units in each embodiment of the present disclosure may be integrated into one processing unit. Alternatively, each unit may exist as a physically independent entity. Alternatively, two or more units may be integrated into one unit. The above integrated unit can be implemented in a form of hardware or in a form of a software functional unit.

The integrated unit, if being implemented in a form of a software functional unit and sold or used as a standalone product, may be stored in a computer readable storage medium. Based on such understanding, the essence of the technical solutions of the present disclosure, or the parts that make contributions to the existing technologies, or all or parts of the technical solutions, may be embodied in a form of a software product. Such computer software product is stored in a storage medium, and includes a number of instructions to cause a computing device (which may be a personal computer, a server or a network device, etc.) to perform all or part of the operations of the methods described in various embodiments of the present disclosure. The storage medium includes: a U disk, a Read-Only Memory (ROM), a Random Access Memory (RAM), a removable hard disk, a magnetic disk, or an optical disk, etc.

The above only describes the preferred embodiments of the present disclosure. It should be noted that one skilled in the art can also make a number of improvements and polishing without departing from the principles of the present disclosure. These improvements and polishing should be considered to fall within the scope of protection of the present disclosure.

The present disclosure can be further understood using the following clauses.

Clause 1: A key processing method comprising: a security chip receiving a dynamic measurement request for a cryptographic operation; and the security chip generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

Clause 2: The method of Clause 1, wherein the random number comprises a first random number and a second random number, the first random number being used for preventing from being attacked during a process of responding the request, and the second random number being used for generating the child key of the platform measurement root key.

Clause 3: The method of Clause 2, wherein the first random number is included in the dynamic measurement request for the cryptographic operation, and the second random number is generated by the security chip.

Clause 4: The method of Clause 1, further comprising: the security chip transmitting the child key of the platform measurement root key to a cryptographic operation chip, to allow the cryptographic operation chip to store the child key of the platform measurement root key in a local storage device in advance before the cryptographic operation is performed.

Clause 5: The method of Clause 4, further comprising: the security chip storing the child key of the platform measurement root key in a local storage device.

Clause 6: The method of Clause 4, further comprising: the security chip determining the child key of the platform measurement root key based on user information of a user, the first random number, and a fourth random number that is determined based on a first random number in response to receiving another request from the user corresponding to the dynamic measurement request for the cryptographic operation, under a condition that the security chip does not have the child key of the platform measurement root key stored in a local storage device.

Clause 7: The method of Clause 1, further comprising: the security chip generating a third random number; and the security chip generating a cryptographic operation measurement key based on the platform measurement root key and the third random number, wherein the cryptographic operation measurement key is used to encrypt a loading process and an execution process of a cryptographic operation measurement.

Clause 8: The method of Clause 7, further comprising: the security chip transmitting the cryptographic operation measurement key to a terminal device, wherein the terminal device is a device that initiates the dynamic measurement request for the cryptographic operation.

Clause 9: The method of any one of Clauses 1-8, wherein: after the security chip receiving the dynamic measurement request for the cryptographic operation, the method further comprises: under a condition that the dynamic measurement request for the cryptographic operation includes a user platform identity certificate, the security chip performing authentication on the user corresponding to the dynamic measurement request for the cryptographic operation based on the user platform identity certificate, and allowing a dynamic measurement of the cryptographic operation to be performed when the authentication is passed.

Clause 10: A key processing method comprising: a first chip receiving a child key of a platform measurement root key transmitted by a second chip, wherein the child key of the platform measurement root key is generated by the second chip based on the platform measurement root key and a random number, the child key of the platform measurement root key is used to encrypt a loading process and an execution process measured by a dynamic measurement module, and the dynamic measurement module is a module used for measuring a firmware that performs a cryptographic operation; and the first chip storing the child key of the platform measurement root key in a local storage device.

Clause 11: The method of Clause 10, wherein the random number comprises a first random number and a second random number, the first random number is included in a dynamic measurement request for the cryptographic operation, and is used for preventing from being attacked during a process of responding the request, and the second random number is generated by the security chip, and is used for generating the child key of the platform measurement root key.

Clause 12: The method of Clause 11, further comprising: the first chip receiving a measurement request for a cryptographic algorithm sent by the second chip, wherein the measurement request for the cryptographic algorithm includes a user platform identity certificate of a user and a first random number; and the first chip verifying the validity of the first random number, and verifying the legitimacy of an identity of the user based on the user platform identity certificate.

Clause 13: The method of Clause 10, further comprising: the first chip receiving a cryptographic operation measurement key transmitted by the second chip, wherein the cryptographic operation measurement key is used to encrypt a loading process and an execution process of a cryptographic operation measurement, the cryptographic operation measurement key is generated by the second chip based on the platform measurement root key and a third random number, and the third random number is generated by the second chip; and the first chip storing the cryptographic operation measurement key in the local storage device.

Clause 14: The method of any one of Clauses 10-13, wherein the first chip is used for performing the cryptographic operation on data, and the second chip is used for performing secure encryption and secure authentication on the data.

Clause 15: A key processing apparatus, being applied to a security chip, comprising: a receiving module configured to receive a dynamic measurement request for a cryptographic operation; and a generating module configured to generate a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations.

Clause 16: A storage medium, the storage medium comprising a stored program, wherein the program, when executed, controls a device in which the storage medium is located to perform the key processing method of any one of Clauses 1-14.

17. A processor, the processor being configured to execute a program, wherein the program, when executed, performs the key processing method of any one of claims 1-14.

What is claimed is:

1. A method implemented by a security chip comprising one or more processors and memory, the method comprising:
    receiving a dynamic measurement request for a cryptographic operation;
    generating a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations;
    generating a third random number;
    generating a cryptographic operation measurement key based on the platform measurement root key and the third random number, wherein the cryptographic operation measurement key is used to encrypt a loading process and an execution process of a cryptographic operation measurement; and
    transmitting the cryptographic operation measurement key to a terminal device, wherein the terminal device is a device that initiates the dynamic measurement request for the cryptographic operation.

2. The method of claim 1, wherein the random number comprises a first random number and a second random number, the first random number being used for preventing from being attacked during a process of responding the request, and the second random number being used for generating the child key of the platform measurement root key.

3. The method of claim 2, wherein the first random number is included in the dynamic measurement request for the cryptographic operation, and the second random number is generated by the security chip.

4. The method of claim 1, further comprising:
    transmitting the child key of the platform measurement root key to a cryptographic operation chip, to allow the cryptographic operation chip to store the child key of the platform measurement root key in a local storage device in advance before the cryptographic operation is performed.

5. The method of claim 4, further comprising:
    storing the child key of the platform measurement root key in the local storage device.

6. The method of claim 4, further comprising:
    determining the child key of the platform measurement root key based on user information of a user, a first random number, and a fourth random number that is determined based on the first random number in response to receiving another request from the user corresponding to the dynamic measurement request for the cryptographic operation, under a condition that the security chip does not have the child key of the platform measurement root key stored in the local storage device.

7. The method of claim 1, wherein: after receiving the dynamic measurement request for the cryptographic operation, the method further comprises:
under a condition that the dynamic measurement request for the cryptographic operation includes a user platform identity certificate, the security chip performing authentication on the user corresponding to the dynamic measurement request for the cryptographic operation based on the user platform identity certificate, and allowing a dynamic measurement of the cryptographic operation to be performed when the authentication is passed.

8. One or more processor readable media storing executable instructions that, when executed by one or more processors of a first chip, cause the one or more processors to perform acts comprising:
receiving a child key of a platform measurement root key transmitted by a second chip, wherein the child key of the platform measurement root key is generated by the second chip based on the platform measurement root key and a random number, the child key of the platform measurement root key is used to encrypt a loading process and an execution process measured by a dynamic measurement module, the dynamic measurement module is a module used for measuring a firmware that performs a cryptographic operation, and the random number comprises a first random number and a second random number, the first random number is included in a dynamic measurement request for the cryptographic operation, and is used for preventing from being attacked during a process of responding the request, and the second random number is generated by the second chip, and is used for generating the child key of the platform measurement root key;
storing the child key of the platform measurement root key in a local storage device;
receiving a measurement request for a cryptographic algorithm sent by the second chip, wherein the measurement request for the cryptographic algorithm includes a user platform identity certificate of a user and a first random number; and
verifying validity of the first random number, and verifying legitimacy of an identity of the user based on the user platform identity certificate.

9. The one or more processor readable media of claim 8, the acts further comprising:
receiving a cryptographic operation measurement key transmitted by the second chip, wherein the cryptographic operation measurement key is used to encrypt a loading process and an execution process of a cryptographic operation measurement, the cryptographic operation measurement key is generated by the second chip based on the platform measurement root key and a third random number, and the third random number is generated by the second chip; and
storing the cryptographic operation measurement key in the local storage device.

10. The one or more processor readable media of claim 8, wherein the first chip is used for performing the cryptographic operation on data, and the second chip is used for performing secure encryption and secure authentication on the data.

11. An apparatus comprising:
one or more processors;
memory;
a receiving module stored in the memory and executable by the one or more processors to receive a dynamic measurement request for a cryptographic operation; and
a generating module stored in the memory and executable by the one or more processors to generate a child key of a platform measurement root key based on the platform measurement root key and a random number, wherein the child key of the platform measurement root key is used for encrypting a loading process and an execution process measured by a dynamic measurement module, and the dynamic measurement module is a module used for measuring a firmware that performs cryptographic operations, wherein the apparatus is further configured to:
transmit the child key of the platform measurement root key to a cryptographic operation chip, to allow the cryptographic operation chip to store the child key of the platform measurement root key in a local storage device in advance before the cryptographic operation is performed, and
determine the child key of the platform measurement root key based on user information of a user, a first random number, and a fourth random number that is determined based on the first random number in response to receiving another request from the user corresponding to the dynamic measurement request for the cryptographic operation, under a condition that a security chip does not have the child key of the platform measurement root key stored in the local storage device.

12. The apparatus of claim 11, wherein the random number comprises the first random number and a second random number, the first random number being used for preventing from being attacked during a process of responding the request, and the second random number being used for generating the child key of the platform measurement root key.

13. The apparatus of claim 12, wherein the first random number is included in the dynamic measurement request for the cryptographic operation, and the second random number is generated by the security chip.

14. The apparatus of claim 11, wherein the generating module is further configured to generate a third random number; and generate a cryptographic operation measurement key based on the platform measurement root key and the third random number, wherein the cryptographic operation measurement key is used to encrypt a loading process and an execution process of a cryptographic operation measurement.

* * * * *